(12) United States Patent
Ye (10) Patent No.: US 10,346,414 B2
(45) Date of Patent: Jul. 9, 2019

(54) INFORMATION COLLECTION METHOD AND DEVICE

(71) Applicant: ZTE Corporation, Shenzhen (CN)

(72) Inventor: Wei Ye, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 527 days.

(21) Appl. No.: 15/030,730

(22) PCT Filed: May 23, 2014

(86) PCT No.: PCT/CN2014/078335
§ 371 (c)(1),
(2) Date: Apr. 20, 2016

(87) PCT Pub. No.: WO2014/180393
PCT Pub. Date: Nov. 13, 2014

(65) Prior Publication Data
US 2016/0253328 A1    Sep. 1, 2016

(30) Foreign Application Priority Data

Oct. 21, 2013 (CN) .......................... 2013 1 0495565

(51) Int. Cl.
| | |
|---|---|
| *G06F 17/30* | (2006.01) |
| *G06F 16/2457* | (2019.01) |
| *G06F 16/22* | (2019.01) |
| *G06F 16/245* | (2019.01) |
| *G06F 16/951* | (2019.01) |

(52) U.S. Cl.
CPC ........ *G06F 16/24578* (2019.01); *G06F 16/22* (2019.01); *G06F 16/245* (2019.01); *G06F 16/951* (2019.01)

(58) Field of Classification Search
CPC .......................... G06F 16/245; G06F 16/24578
USPC ........................................................ 707/723
See application file for complete search history.

(56) References Cited

U.S. PATENT DOCUMENTS

| | | | |
|---|---|---|---|
| 7,983,963 B2 | 7/2011 | Byrne | |
| 2001/0044810 A1* | 11/2001 | Timmons | G06F 17/30864 715/207 |
| 2004/0210560 A1* | 10/2004 | Shuster | G06F 17/30864 |
| 2009/0175268 A1 | 7/2009 | Li | |

(Continued)

FOREIGN PATENT DOCUMENTS

| | | |
|---|---|---|
| CN | 1417709 A | 5/2003 |
| CN | 101079710 A | 11/2007 |

(Continued)

OTHER PUBLICATIONS

International Search Report in international application No. PCT/CN2014/078335, dated Aug. 27, 2014.

(Continued)

*Primary Examiner* — Shahid A Alam
(74) *Attorney, Agent, or Firm* — Oppedahl Patent Law Firm LLC (57) ABSTRACT

An information collection method and device are described, the method includes that: network browsing information is acquired; the network browsing information is evaluated; the network browsing information is sorted according to evaluation results; and a network retrieval list is generated or updated according to a sorting result.

14 Claims, 7 Drawing Sheets

(56) References Cited

U.S. PATENT DOCUMENTS

2009/0300007 A1* 12/2009 Hiraoka ............ G06F 17/30011
2011/0302375 A1* 12/2011 Elko ................. G06F 17/30348
                                                                                              711/147
2014/0337404 A1* 11/2014 Jitkoff ............... G06F 17/30884
                                                                                              709/203

FOREIGN PATENT DOCUMENTS

| CN | 101093487 A |   12/2007 |
| CN | 101178728 A |    5/2008 |
| CN | 101281519 A | * 10/2008 |
| CN | 101281519 A |   10/2008 |
| CN | 102209065 A |   10/2011 |
| CN | 102332020 A |    1/2012 |
| CN | 102354315 A |    2/2012 |
| CN | 102387207 A |    3/2012 |

OTHER PUBLICATIONS

English Translation of the Written Opinion of the International Search Authority in international application No. PCT/CN2014/078335, dated Aug. 27, 2014.

* cited by examiner

INFORMATION COLLECTION METHOD AND DEVICE

TECHNICAL FIELD

The present disclosure relates to the field of computer technologies, and more particularly, to an information collection method and device.

BACKGROUND

With the rapid development of Internet technologies, people mainly acquires information by browsing web pages, and an important application of network browsing is to retrieve a content of interest from a large amount of network information, and store a corresponding retrieval result to facilitate access of a user at any time.

At present, a regular retrieval method uses a search engine based on keyword retrieval, and stores a retrieval result with a bookmark function provided by a browser. However, such an implementation method is lack of initiative and relies too much on user participation in automatic data updating and screening.

SUMMARY

In view of this, an embodiment of the present disclosure provides an information collection method, including that:

network browsing information is acquired;

the network browsing information is evaluated, the network browsing information is sorted according to evaluation results, and a network retrieval list is generated or updated according to a sorting result.

Preferably, the method may further include that: websites matched with the network retrieval list may be searched through a search engine, and the searched websites may be pushed according to the sorting of the network retrieval list.

Preferably, the network browsing information may include: at least one of website address information transmitted by a user to a network server through a client, an accessed text content, a duration of a single access of the user, and a number of user access times of the user to the same website.

Preferably, the method may further include that: the generated or updated network retrieval list is stored in an account corresponding to a user data server.

Preferably, the step that the network browsing information is evaluated, the network browsing information is sorted according to the evaluation results, and the network retrieval list is generated or updated according to the sorting result may include that:

evaluation data for evaluating a score is extracted from the acquired network browsing information; the score is calculated for the extracted evaluation data according to a preset algorithm; whether the network retrieval list exists is judged; when the network retrieval list does not exist, a new network retrieval list is generated, the network browsing information and the calculated score are added to the network retrieval list, and the ranking of the network browsing information is set to the top; otherwise, the calculated score and a score stored in the network retrieval list are compared and sorted, and the network retrieval list is updated according to a sorting result; and a text content in the network browsing information is stored in a corresponding entry of the network retrieval list.

Preferably, the step that the websites matched with the network retrieval list are searched through the search engine may specifically include that websites matched with the entry in the network retrieval list are searched through the search engine according to the text content stored in the entry of the network retrieval list Preferably, the step that the score is calculated for the extracted evaluation data according to the preset algorithm may include that:

it is set that there are N records in the network retrieval list, the extracted evaluation data is compared with existing evaluation data in the network retrieval list; when a similarity is greater than or equal to a first preset threshold, a weight value is set as 1; when a similarity is smaller than or equal to a second preset threshold, a weight value is set as 0; when a similarity is smaller than the first preset threshold and greater than the second preset threshold, a weight value is set as an integral multiple of $1/N$; and the weight values are added to acquire M, where $N>0$, $0<1/N<1$, $M\leq N$;

if a user accesses a record for X times, and the durations of the accesses are $T1, T2, \ldots Tx$, respectively, then an average duration of each access $T=T1+T2+\ldots+Tx/X$; and the score is calculated $Q=(M/N)\times T$.

Preferably, the step that the calculated score and the score stored in the network retrieval list are compared and sorted, and the network retrieval list is updated according to the sorting result may include that: the score Q is compared with scores of N entries in the network retrieval list respectively; if Q is smaller than a score Qi of the $i^{th}$ entry, and greater than a score Qi+1 of the $(i+1)^{th}$ entry, a text content accessed currently and the score Q are recorded to the network retrieval list, a sequence number is recorded as i+1, and sequence numbers of entries after the $(i+1)^{th}$ entry are increased by 1; if the score Q is the same as a score of the $i^{th}$ entry in the network retrieval list, the text content accessed currently and the score Q are recorded to the $i^{th}$ record of the network retrieval list, and other records of the network retrieval list are kept unchanged; and if the score is smaller than scores of all entries in the network retrieval list, the text content accessed currently and the score Q are recorded in the network retrieval list, and a sequence number is set as N+1.

An embodiment of the present disclosure further provides an information collection device, including:

an acquiring module, configured to acquire network browsing information;

a processing module, configured to evaluate the network browsing information, sort the network browsing information according to evaluation results, and generate or update a network retrieval list according to a sorting result.

Preferably, the device may further include: a pushing module, configured to search websites matched with the network retrieval list through a search engine, and push the searched websites according to the sorting of the network retrieval list.

Preferably, the network browsing information may include: at least one of website address information transmitted by a user to a network server through a client, an accessed text content, a duration of a single access of the user, and a number of user access times of the user to the same website.

Preferably, the processing module may be further configured to store the generated or updated network retrieval list in an account corresponding to a user data server.

Preferably, the processing module may be further configured to: extract evaluation data for evaluating a score from the acquired network browsing information; calculate the score for the extracted evaluation data according to a preset algorithm; judge whether the network retrieval list exists;

when the network retrieval list does not exist, generate a new network retrieval list, add the network browsing information and the calculated score to the network retrieval list, and set the ranking of the network browsing information to the top; otherwise, compare and sort the calculated score and a score stored in the network retrieval list, and update the network retrieval list according to a sorting result; and store a text content in the network browsing information in a corresponding entry of the network retrieval list.

Preferably, the pushing module may be further configured to; search, through the search engine according to the text content stored in the entry of the network retrieval list, websites matched with the entry in the network retrieval list.

Preferably, the processing module may be further configured to: set that there are N records in the network retrieval list, compare the extracted evaluation data with existing evaluation data in the network retrieval list; when a similarity is greater than or equal to a first preset threshold, set a weight value as 1; when a similarity is smaller than or equal to a second preset threshold, set a weight value as 0; when a similarity is smaller than the first preset threshold and greater than the second preset threshold, set a weight value as an integral multiple of 1/N; and add the weight values to acquire M, where N>0, 0<1 /N<1, M≤N; if a user accesses a record for X times, and the durations of the accesses are T1, T2, . . . Tx, respectively, then an average duration of each access T=(T1+T2+ . . . +Tx)/X; and calculate the score Q(M/N)×T.

Preferably, the processing module may be further configured to: compare the score Q with scores of N entries in the network retrieval list respectively; if Q is smaller than a score $Q_i$ of the $i^{th}$ entry, and greater than a score $Q_{i+1}$ of the (i+1) entry, record a text content accessed currently and the score Q to the network retrieval list, record a sequence number as i+1, and increase sequence numbers of entries after the $(i+1)^{th}$ entry by 1; if the score Q is the same as a score of the $i^{th}$ entry in the network retrieval list, record the text content accessed currently and the score Q to the $i^{th}$ record of the network retrieval list, and keep other records of the network retrieval list unchanged; and if the score is smaller than scores of all entries in the network retrieval list, record the text content accessed currently and the score Q in the network retrieval list, and set a sequence number as N+1.

Preferably, the device may further include: a switch module, configured to turn on or turn off a search service push device according to an operation of the user.

Preferably, the information collection device is arranged in the user data server.

The acquiring module, the processing module, the pushing module and the switch module may be implemented by a Central Processing Unit (CPU), a Digital Signal Processor (DSP) or a Field-Programmable Gate Array (FPGA) when executing processing.

According to embodiments of the present disclosure, network browsing information of a user is acquired, a network browsing habit of the user is concluded according to a certain score judging rule, and a corresponding retrieval list is generated and updated in time, thereby solving the problem in the related art that a retrieval result relies too much on user participation to be stored passively, so that a related website retrieval result of interest may be fed back rapidly according to the browsing habit of the user, and network experience of the user is improved.

The description above is only a summary of the technical solutions of the embodiments of the present disclosure, specific implementation modes of the embodiments of the present disclosure will be illustrated specifically below so that the technical means of the embodiments of the present disclosure may be understood more clearly and thus can be implemented according to the content of the specification and the aforementioned and other purposes, characteristics and advantages of the embodiments of the present disclosure are more apparent and easily understood.

DETAILED DESCRIPTION

Exemplary embodiments of the present disclosure will be described in more details hereinafter with reference to the accompanying drawings. Although the exemplary embodiments of the present disclosure have been shown in the accompanying drawings, it should be understood that the present disclosure may be implemented in various forms and should not be limited by the embodiments elaborated herein. On the contrary, these embodiments are provided so that the present disclosure may be understood more thoroughly, and the scope of the present disclosure may be completely conveyed to those skilled in the art.

In order to solve the problem in the related art that a retrieval result relies too much on user participation to be stored passively, the present disclosure provides an information collection system with an automatic learning mechanism, so that a retrieved and browsed content of a user can be stored automatically and updated in time, so as to feed back a related website retrieval result of interest rapidly according to a browsing habit of the user, thereby improving network experience of the user. The present disclosure will be further expounded below in combination with the accompanying drawings and embodiments. It should be understood that the specific embodiments described herein are only used for explaining the present disclosure, instead of limiting the present disclosure.

Method Embodiment

Figure 1:
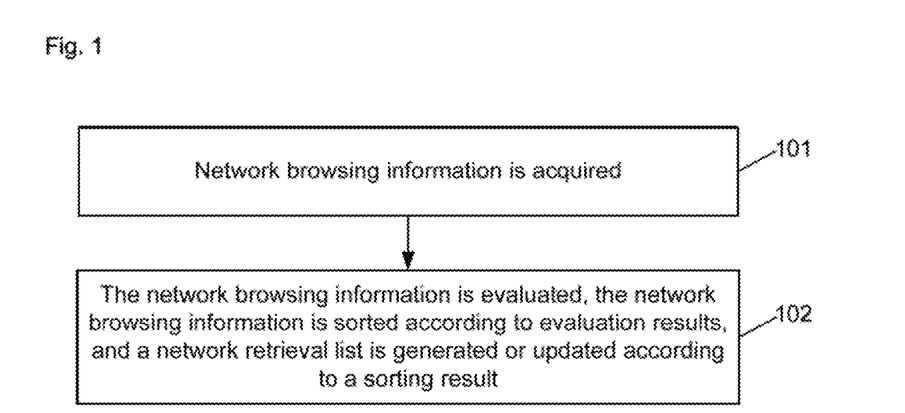
FIG. 1 is a flowchart of an information collection method according to an embodiment of the present disclosure.

An information collection method is provided according to an embodiment of the present disclosure. FIG. 1 is a flowchart of an information: collection method according to an embodiment of the present disclosure. As shown in FIG. 1, the information collection method according to the embodiment of the present disclosure includes the following processing.

Step 101: Network browsing information is acquired, wherein the network browsing information includes at least one of the followings: website address information transmitted by a user to a network server through a client, an accessed text content, a duration of a single access of the user, the number of user access times of the user to the same website, other interaction information and so on. It needs to be noted that, the extracted network browsing information is determined according to a score evaluation algorithm, and includes, but is not limited to the listed data.

Step 102: The network browsing information is evaluated, the network browsing information is sorted according to evaluation results, and a network retrieval list is generated or updated according to a sorting result, wherein the evaluation means that a score of the network browsing information is evaluated to be used as a sorting standard for generating the network retrieval list subsequently.

Step 102 specifically includes the following processing: 1: evaluation data for evaluating a score is extracted from the acquired network browsing information; 2: the score is calculated for the extracted evaluation data according to a preset algorithm; 3: whether the network retrieval list exists is judged, if no, a new network retrieval list is generated, the network browsing information and the calculated score are added to the network retrieval list, and the ranking of the network browsing information is set to the top; otherwise, the calculated score and a score stored in the network retrieval list are compared and sorted, and the network retrieval list is updated according to a sorting result; 4: a text content in the network browsing information is stored in a corresponding entry of the network retrieval list.

That the score is calculated for the extracted evaluation data according to the preset algorithm specifically includes that:

it is assumed that there are N records in the network retrieval list, the extracted evaluation data is compared with existing evaluation data in the network retrieval list; when a similarity is greater than or equal to a first preset threshold, a weight value is set as 1; when a similarity is smaller than or equal to a second preset threshold, a weight value is set as 0; when a similarity is smaller than the first preset threshold and greater than the second preset threshold, a weight value is set as an integral multiple of $1/N$; and the weight values are added to acquire M, where $N>0$, $0<1/N<1$, $M\leq N$;

it is assumed that a user accesses a record for X times, and the durations of the accesses are $T1, T2, \ldots Tx$, respectively, then an average duration of each access $T=(T1+T2+ \ldots +Tx)/X$; and the score is calculated $Q=(M/N)\times T$.

In step 102, that the calculated score and the score stored in the network retrieval list are compared and sorted, and the network retrieval list is updated according to the sorting result specifically includes that:

the score Q is compared with scores of N entries in the network retrieval list respectively; if Q is smaller than a score $Qi$ of the $i^{th}$ entry, and greater than a score $Qi+1$ of the $(i+1)^{th}$ entry, a text content accessed currently and the score Q are recorded to the network retrieval list, a sequence number is recorded as $i+1$, and sequence numbers of entries after the $(i+1)$ entry are increased by 1;

if the score Q is the same as a score of the $i^{th}$ entry in the network retrieval list, the text content accessed currently and the score Q are recorded to the $i^{th}$ record of the network retrieval list, and other records of the network retrieval list are kept unchanged; and if the score is smaller than scores of all entries in the network retrieval list, the text content accessed currently and the score Q are recorded in the network retrieval list, and a sequence number is set as $N+1$.

Preferably, when the user requires a search service, websites matched with the network retrieval list are searched through a search engine, and the searched websites are pushed to the user according to the sorting of the network retrieval list.

In the processing above, a website matched with an entry in the network retrieval list may be searched by the search engine according to the text content stored in the entry of the network retrieval list.

Preferably, in the embodiment of the present disclosure, the generated or updated network retrieval list may be also stored in an account corresponding to a user data server. Besides, a user interface is provided in a user setting option of a client browser so as to turn on or turn off the system, thus respecting a privacy habit of the user and improving user experience. That is, pushing of a search service is turned off or turned on according to an operation of the user.

The technical solutions of the embodiments of the present disclosure will be expounded below in combination with the accompanying drawings.

Figure 2:
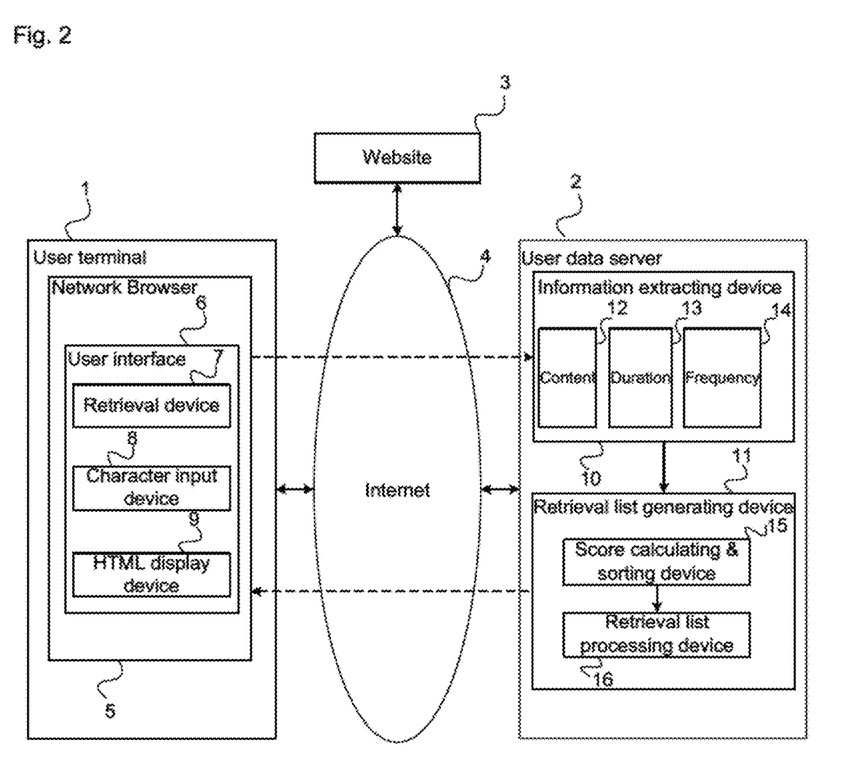
FIG. 2 is a system block diagram of configuration of an information collection system according to an embodiment of the present disclosure.

FIG. 2 is a system block diagram of configuration of an information collection system according to an embodiment of the present disclosure. As shown in FIG. 2, the information collection system provided by a search service pushing method according to the embodiment of the present disclosure includes: a user terminal 1 and a user data server 2. The user terminal 1 and the user data server 2 are connected to the Internet 4 respectively, and a website (i.e., a world wide web server) is also connected to the Internet 4.

The user terminal 1 includes a Personal Computer (PC). A network browser 5 mainly provides an interface function of an Internet user (hereinafter referred to as a user for short) and a network: A user interface 6 includes a retrieval device 7, a character input device 8, a HyperText Markup Language (HTML) display device 9 and so on. The user terminal 1 includes, but is not limited to the PC, and may be also any small-size handheld mobile information terminal (such as a Personal Digital Assistant (PDA), and a mobile phone) mounted with a network browser, as long as the network browser 5 can be supported.

Based on the system block diagram as shown in FIG. 2, a flow implemented by exchange of hardware entities in the system block diagram includes the following steps.

Step 201: A Uniform Resource Locator (URL) is inputted into the network browser 5 by using the character input device 8, and the retrieval device 7 provides the user interface to use the information collection system of the present disclosure.

Step 202: The user data server 2 receives user data transmitted by the Internet, and the retrieval server 2 includes an information extracting device 10 and a retrieval list generating device 11.

Step 203: The information extracting device 10 is responsible for extracting a content 12 (a text content), a duration 13 (a duration of a single access of a user), a frequency 14 (the number of access times of the user to the same website) from the user data, and then transmitting the extracted data to the retrieval list generating device 11 to be processed.

Step 204: In the retrieval list generating device 11, a score calculating & sorting device 15 first scores and sorts the user information transmitted by the information extracting device 10, then a retrieval list processing device 16 updates (when the retrieval list does not exist, a retrieval list is generated according to the user information first) according to a sorting result.

Step 205: The user data server 2 transmits the retrieval list to the network browser 5 through the Internet, and according to the retrieval list, the network browser 5 feeds back a related site to the user through the HTML display device 9.

Figure 3A:
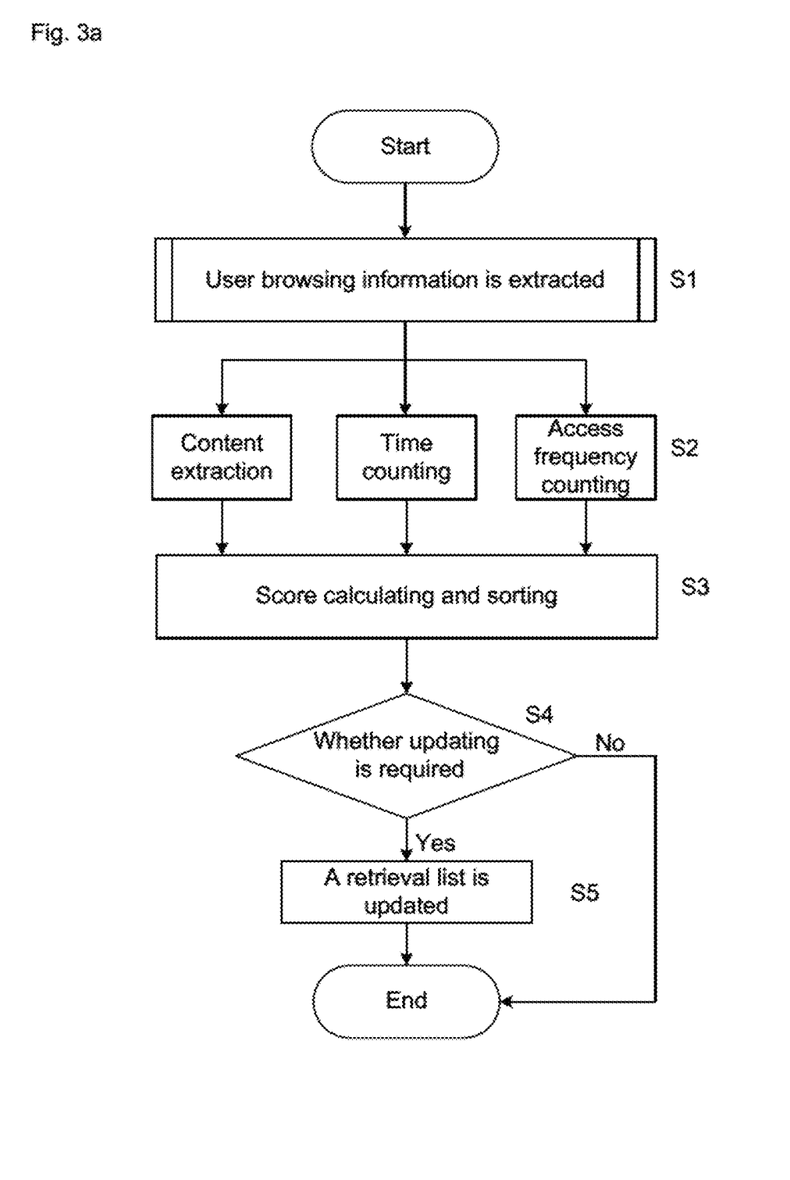
FIG. 3a to FIG. 3b are flowcharts of processes of generating and updating a network retrieval list according to an embodiment of the present disclosure.
Figure 3B:
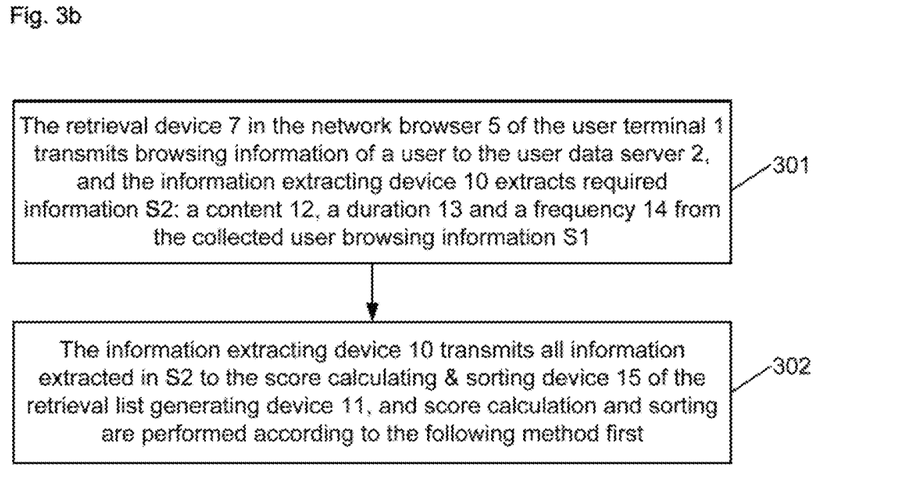

FIG. 3a to FIG. 3b are flowcharts of processes of generating and updating a network retrieval list according to an embodiment of the present disclosure. FIG. 3a shows an interaction diagram of objects indicated based on S1 to S5. In combination with the flowcharts of the steps as shown in FIG. 3a and FIG. 3b, the following steps are specifically included as shown in FIG. 3b.

Step 301: The retrieval device 7 in the network browser 5 of the user terminal 1 transmits browsing information of a user to the user data server 2. The information extracting device 10 extracts required information S2: a content 12 (a text content), a duration 13 (a duration of a single access of the user) and a frequency 14 (the number of access times of the user to the same website) from the collected user browsing information S1.

Figure 4:
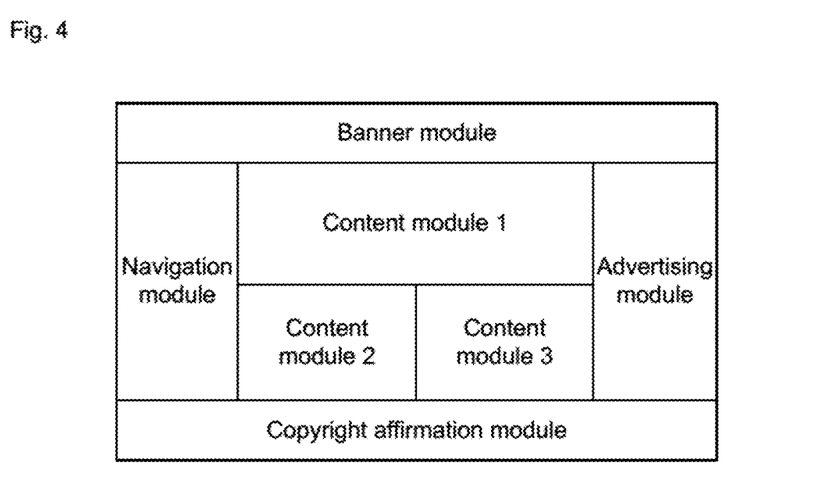
FIG. 4 is a schematic diagram of an extracted text content according to an embodiment of the present disclosure.
Figure 5:
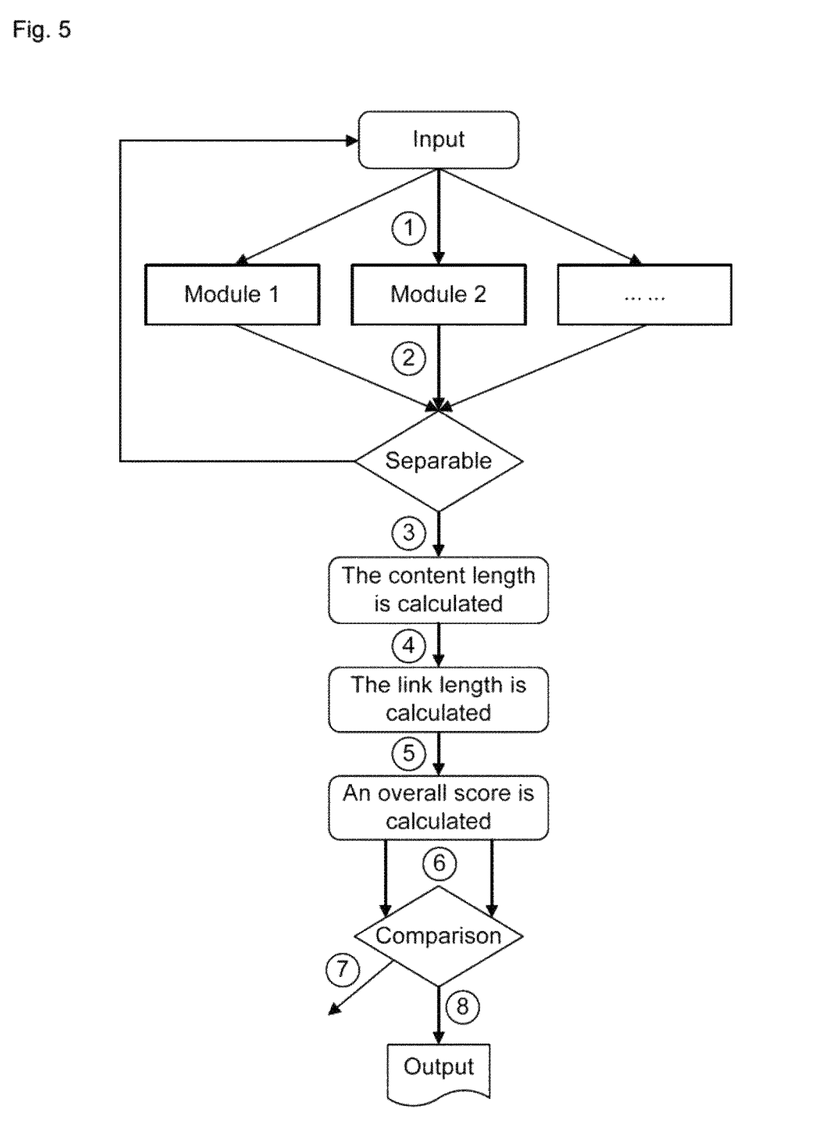
FIG. 5 is a flowchart of extracting a text content according to an embodiment of the present disclosure.

A text content extracting method will be described in brief below. FIG. 4 is a schematic diagram of extraction of a text content according to an embodiment of the present disclosure, and FIG. 5 is a flowchart of extracting a text content according to an embodiment of the present disclosure. Based on the contents as shown in FIG. 4 and FIG. 5, a specific corresponding information extraction method includes the following steps.

Step 3011: The user data server acquires, according to a URL address submitted by the user through the browser, a webpage designated on a network server, and then decomposes, according to a feature that a Table label and a Div label are used for supporting a layout, an inputted HTML webpage into a plurality of modules. An advantage of the step is that the modules are obtained through the decomposition by using two labels, i.e., the Table label and the Div label, for a layout purpose, because the labels are for a layout purpose on one hand, and webpage analysis is simplified on the other hand. It is unnecessary to process other labels such as span and br, thereby greatly accelerating webpage analysis and reducing analysis of system resources.

Step 3012: If the modules obtained through the decomposition in step 3011 can be further decomposed, and the labels Table and Div are not mixed, the modules are further decomposed in step i>.

Step 3013: Scores of different positions are assigned to the inputted modules according to different positions in a layout.

Step 3014: The length of a link text of each module and the length of a text in a hyperlink of each module are calculated.

Step 3015: An overall score of each module is obtained according to a formula: overall score (position score)×(text length)/(link text length), a module having the highest overall score is a content module, and a text content thereof is extracted.

In step 301, the following processing further needs to be performed after the processing above.

Step 3016: A duration from the moment when the user opens a browser tab page to access a certain website to the moment when the user closes the tab page is used as a duration of a single access, the duration is recorded, and a frequency corresponding to an URL of the access is increased by 1.

Step 3017: The text content, the access duration and the number of access times obtained in step 5 and step 6 are recorded to corresponding user account information in the user data server to be used as a basis for score evaluation and sorting in subsequent steps.

Step 302: The information extracting device 10 transmits all information extracted in S2 to the score calculating & sorting device 15 of the retrieval list generating device 11, and score calculation and sorting are performed according to the following method first.

Step 3021: When a retrieval list does not exist or is null, the data is added into the retrieval list, and the ranking of the data is set to the top.

Step 3022: When the retrieval list exists; it assumed that there are N(N>0) records in the list, and the extracted content is compared with an existing content in the list; when a similarity is greater than 90%, a weight value is 1; when a similarity is smaller than 50%, a weight value is 0, and remaining weight values are integral multiple of 1/N among 0 to 1; the weight values are added to obtain M(M←N).

Step 3023: It is assumed that the user accesses the browsing information for X times, and the durations of the accesses are T1, T2, . . . Tx respectively, then an average duration of each access T=(T1+T2+ . . . Tx)/X.

Step 3024; A score Q is calculated by multiplying the gravity of the information in the retrieval list by the average duration, i.e., Q (M/N)×T.

Step 3025: The score Q and record scores existing in the retrieval list are o and the retrieval list is updated according to a sorting result (S4, S5).

Figure 6A:
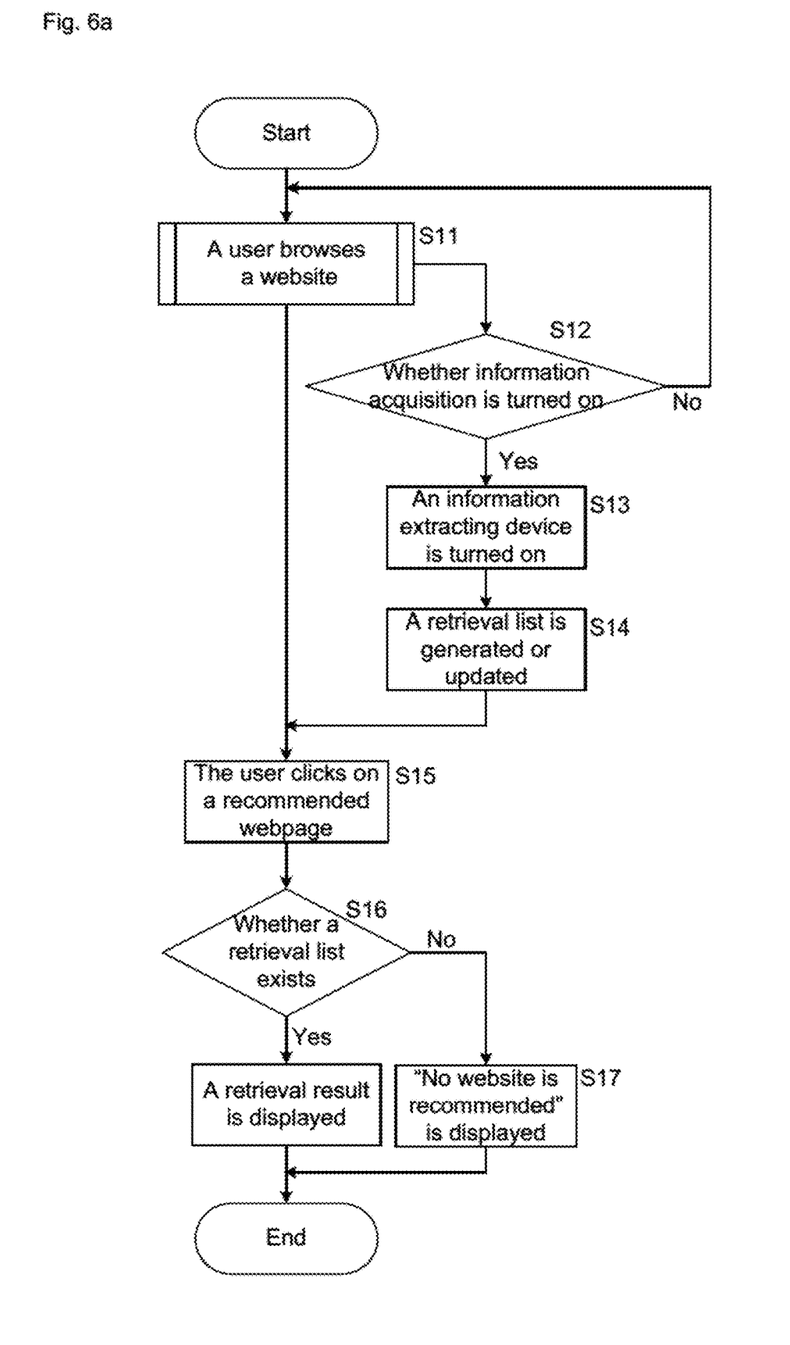
FIG. 6a to FIG. 6b are flowcharts of a network browsing process of a user according to an embodiment of the present disclosure.
Figure 6B:
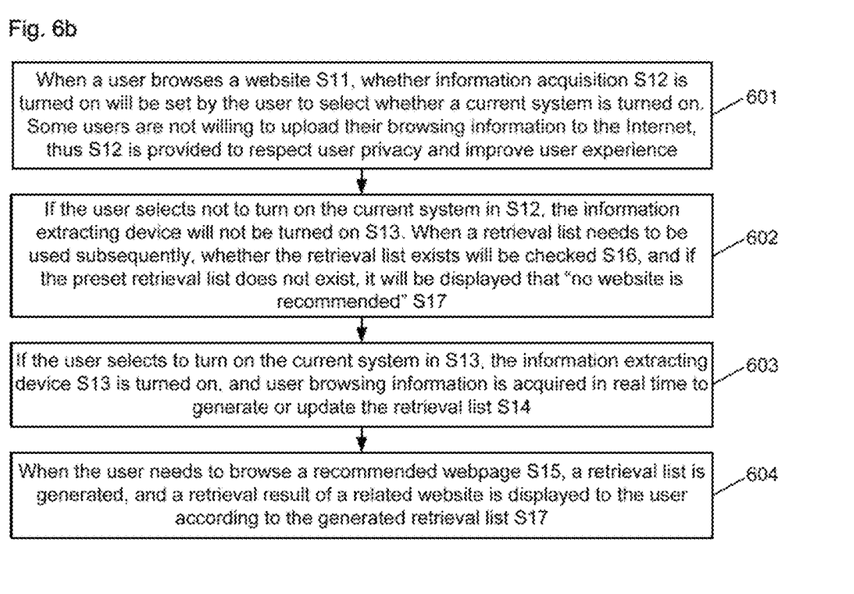

FIG. 6a to FIG. 6b are flowcharts of a network browsing process of a user according to an embodiment of the present disclosure. FIG. 6a shows an interaction diagram of objects indicated based on S11 to S17. The following specific steps are included as shown in FIG. 6b with reference to the flowcharts of the steps as shown in FIG. 6a and FIG. 6b.

Step 601: When a user browses a website S11, whether information acquisition is turned on will be set by the user S12 to select whether a current system is turned on. Some users are not willing to upload their browsing information to the Internet, thus S12 is provided to respect user privacy and improve user experience.

Step 602; If the user selects not to turn on the current system in S12, the information extracting device will not be turned on S13. When a retrieval list needs to be used subsequently, whether the retrieval list exists will be checked S16, and if the preset retrieval list does not exist, it will be displayed that "no website is recommended" S17.

Step 603: If the user selects to turn on the current system in S13, the information extracting device S13 is turned on, and user browsing information is acquired in real time to generate or update the retrieval list S14.

Step 604: When the user needs to browse a recommended webpage S15, a retrieval list is generated, and a retrieval result of a related website is displayed to the user according to the generated retrieval list S17.

Figure 7A:
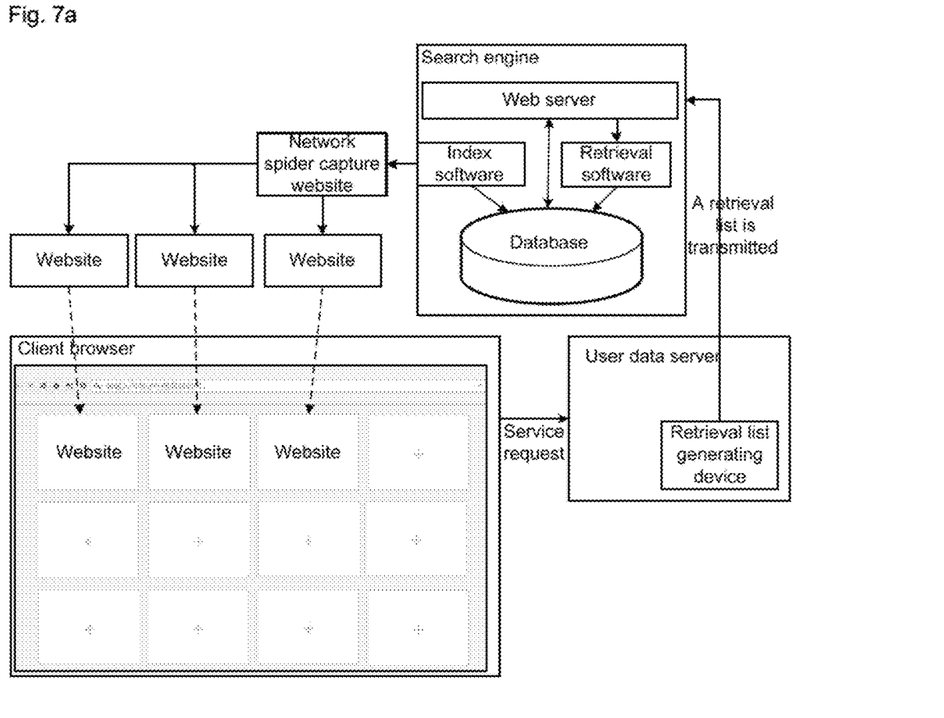
FIG. 7a to FIG. 7b are schematic diagrams of feeding back a generated retrieval list to a user according to an embodiment of the present disclosure.
Figure 7B:
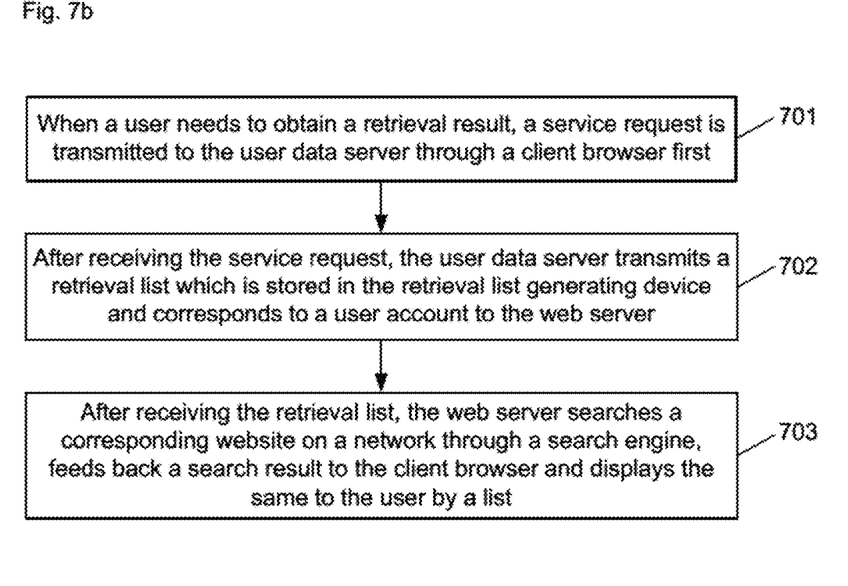

FIG. 7a to FIG. 7b are schematic diagrams of feeding back a generated retrieval list to a user according to an embodiment of the present disclosure. FIG. 7a shows an interaction diagram of interaction performed based on various hardware entities, and FIG. 7b is a block flowchart corresponding to FIG. 7a. As shown in FIG. 7b, the following specific steps are included.

Step 701: When a user needs to obtain a retrieval result, a service request is transmitted to the user data server through a client browser first.

Step 702: After receiving the service request, the user data server transmits a retrieval list which is stored in the retrieval list generating device and corresponds to a user account to the web server.

Step 703: After receiving the retrieval list, the web server searches a corresponding website on a network through a search engine, feeds back a search result to the client browser and displays the same to the user by a list.

The technical solutions of the embodiments of the present disclosure will be illustrated in combination with examples below.

Step 1: A user (corresponding to an account A) turns on a service option in a setting of a client browser.

Step 2: The user accesses "http://news.baidu.com/" (Baidu News) through the client browser for 300 seconds (5 minutes).

Step 3: A user data server acquires a Hypertext Transfer Protocol (HTTP) request of the client browser, and acquires a corresponding HTML page on a network server.

Step 4: A text content is extracted from the acquired HTML page, such as "Baidu news search-the biggest Chinese news platform in the world. Baidu News, which is a news service platform that contains massive information, truly reflects hot news at all times, so that you may search news events, hot topics, celebrity news, product information and so on to learn their latest news rapidly" and so on, and is stored in a text column corresponding to the URL address "http://news.baidu.com/" of the account A in a user server, and the duration 300 seconds of the current access is stored in a time column corresponding to the URL address "http://news.baidu.com/" of the account A. Finally, the content of a frequency column corresponding to the URL address "http://news.baidu.com/" of the account A is increased by 1, thus completing a single extraction of user information.

Step 5: A retrieval list (a content recorded in the retrieval list include a sequence number, a text content and a score) in the account A is extracted. If the content of the list is null, a content indicating that the URL address in the account A is "http://news.baidu.com/" in the text column is put into a text column of the retrieval list, and a sequence is recorded as 1 while a score is recorded as 0.

Step 6: If the retrieval list is not null (there are N records, and N>0), the content indicating that the URL address is "http://news.baidu.com/" in the text column is compared with records in the retrieval list respectively. A weight value is 1 if a similarity is greater than 90%. A weight value is 0 is a similarity is smaller than 50%. The remaining weight values are integral multiples of 1/N among 0 to 1, and the weight values are added to obtain M(M←N).

Step 7: The duration recorded in the content indicating that the URL address in the account A is "http://news.baidu.com/" is divided by the number of times to obtain an average duration T.

Step 8: A score of the current access is calculated $Q=(M/N) \times T$.

Step 9: The obtained score Q is compared with scores of the N records in the retrieval list respectively. If Q is smaller than a score $Q_i$ of the $i^{th}$ entry, and greater than a score $Q_{i+1}$ of the $(i+1)^{th}$ entry, the text content accessed currently and the score Q are recorded to the retrieval list, a sequence number is recorded as i+1, and sequence numbers of entries after the $(i+1)^{th}$ entry are increased by 1.

Step 10: If the score Q is the same as a score of the $i^{th}$ entry in the retrieval list, the text content accessed currently and the score Q are updated to the $i^{th}$ record of the retrieval list, and other records of the retrieval list are kept unchanged.

Step 11: If the score is smaller than scores of all entries in the retrieval list, the text content accessed currently and the score Q are recorded in the network retrieval list, and setting a sequence number as N+1.

Step 12: The retrieval list is maintained in the account A, and the current updating process is completed. If the user accesses another website through the client browser at the moment, a new retrieval list updating process is performed, otherwise, the retrieval list is kept unchanged.

Step 13: When the user needs to acquire a retrieval service, the user data server uploads the retrieval list stored in the account A onto the web server, and feeds back, through a search engine, a searched website to the client browser to display the same to the user, thus completing the service.

To sum up, the technical solutions provided by the embodiments of the present disclosure are based on collection of user browsing information, score calculation and sorting. In other words, an output result of the technical solutions of the embodiments of the present disclosure relies on a network browsing habit of a user, that is, the technical solutions of the embodiments of the present disclosure are able to analyze browsing information of the user within a period of time, update the output result at any time, which is a method with an automatic learning mechanism.

According to the technical solutions of the embodiments of the present disclosure, it is no longer necessary for a user to input a retrieval condition or a corresponding website, and a related website content is provided according to a previous browsing habit of the user if the user requires the website content, so that a webpage can be browsed rapidly, especially on a small size handheld mobile information terminal (such as a PDA and a mobile phone) that usually has strict limitation on an inputted character. The technical solutions of the embodiments of the present disclosure are able to provide a network retrieval service more conveniently and rapidly, thus improving network experience of the user.

Device Embodiment

Figure 8:
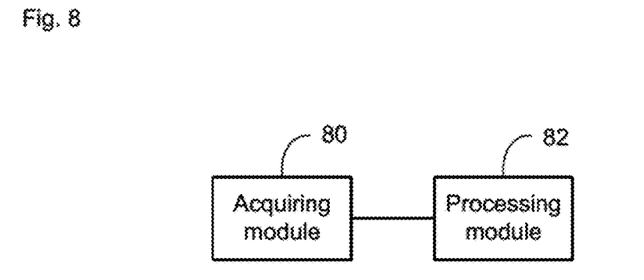
FIG. 8 is a structural diagram of an info on collection device according to an embodiment of the present disclosure.

An information collection device is provided according to an embodiment of the present disclosure. FIG. 8 is a structural diagram of an information collection device according to an embodiment of the present disclosure. As shown in FIG. 8, the information collection device according to the embodiment of the present disclosure includes: an acquiring module 80, and a processing module 82. The modules of the embodiment of the present disclosure will be expounded below.

The acquiring module 80 is configured to acquire network browsing information, wherein the network browsing information includes at least one of the followings; website address information transmitted by a user to a network server through a client, an accessed text content, a duration of a single access of the user, and the number of user access times of the user to the same website.

The processing module 82 is configured to evaluate the network browsing information, sort the network browsing information according to evaluation results, and generate or update a network retrieval list according to a sorting result.

The processing module 82 is further configured to: store the generated or updated network retrieval list in an account corresponding to a user data server.

The processing module 82 is further configured to: extract evaluation data for evaluating a score from the acquired network browsing information; calculate the score for the extracted evaluation data according to a preset algorithm; judge whether the network retrieval list exists; if no, generate a new network retrieval list, add the network browsing information and the calculated score to the network retrieval list, and set the ranking of the network browsing information to the top; otherwise, compare and sort the calculated score and a score stored in the network retrieval list, and update the network retrieval list according to a sorting result; and store a text content in the network browsing information in a corresponding entry of the network retrieval list;

it is assumed that there are N records in the network retrieval list, compare the extracted evaluation data with existing evaluation data in the network retrieval list; when a similarity is greater than or equal to a first preset threshold, set a weight value as 1; when a similarity is smaller than or equal to a second preset threshold, set a weight value as 0; when a similarity is smaller than the first preset threshold and greater than the second preset threshold, set a weight value as an integral multiple of 1/N; and add the weight values to acquire M, where N>0, 0<1/N<1, if a user accesses a record for X times, and the durations of the accesses are T1, T2, . . . Tx, respectively, then an average duration of each access T=(T1+T2+ . . . +Tx)/X; and calculate the score Q=(M/N)×T:

the score Q is compared with scores of N entries in the network retrieval list respectively; if Q is smaller than a score Qi of the $i^{th}$ entry, and greater than a score Qi+1 of the $(i+1)^{th}$ entry, record a text content accessed currently and the score 0 to the network retrieval list, record a sequence number as i+1, and increase sequence numbers of entries after the $(i+1)^{th}$ entry by 1;

is if the score Q is the same as a score of the $i^{th}$ entry in the network retrieval list, record the text content accessed currently and the score Q to the $i^{th}$ record of the network retrieval list, and keep other records of the network retrieval list unchanged; and if the score is smaller than scores of all entries in the network retrieval list, record the text content accessed currently and the score Q in the network retrieval list, and set a sequence number as N+1.

Preferably, the device further includes: a pushing module configured to, when the user requires a search service, search websites matched with the network retrieval list through a search engine, and push the searched websites to the user according to the sorting of the network retrieval list.

Preferably, the pushing module is specifically configured to search, through the search engine according to the text content stored in the entry of the network retrieval list, websites matched with the entry in the network retrieval list.

Preferably, the device further includes: a switch module, configured to turn n or turn off a search service push device according to an operation of the user.

It needs to be noted that the information collection device may be preferably arranged in the user data server.

Detailed processing of the modules of the embodiment of the present disclosure may be understood with reference to the description in the method embodiment and will not be described repeatedly here.

To sum up, according to the technical solutions of the embodiments of the present disclosure, network browsing information of a user is acquired, a network browsing habit of the user is concluded according to a certain score judging rule, and a corresponding retrieval list is generated and updated in time, thereby solving the problem in the related art that a retrieval result relies too much on user participation to be stored passively, so that a related website retrieval result of interest may be fed back rapidly according to the browsing habit of the user, and network experience of the user is improved.

What are described above are only preferred embodiments of the present disclosure, but are not used for limiting the protection scope of the present disclosure

INDUSTRIAL APPLICABILITY

According to embodiments of the present disclosure, network browsing information of a user is acquired, a network browsing habit of the user is concluded according to a certain score judging rule, and a corresponding retrieval list is generated and updated in time, thereby solving the problem in the related art that a retrieval result relies too much on user participation to be stored passively, so that a related website retrieval result of interest may be fed back rapidly according to the browsing habit of the user, and network experience of the user is improved.

What is claimed is:

1. An information collection method, comprising:
  acquiring, by a user data server, network browsing information;
  evaluating, by the user data server, the network browsing information, sorting, by the user data server, the network browsing information according to evaluation results, and generating or updating, by the user data server, a network retrieval list according to a sorting result;
  wherein the step of evaluating the network browsing information, sorting the network browsing information according to the evaluation results, and generating or updating the network retrieval list according to the sorting result by the user data server comprises:
  extracting, by the user data server, evaluation data for evaluating a score from the acquired network browsing information;
  calculating, by the user data server, the score for the extracted evaluation data according to a preset algorithm;
  determining, by the user data server, whether the network retrieval list exists;
  when the network retrieval list does not exist, generating, by the user data server, a new network retrieval list, adding, by the user data server, the network browsing information and the calculated score to the network retrieval list, and setting, by the user data server, the ranking of the network browsing information to the top;
  when the network retrieval list exist, compare and sort the calculated score and a score stored in the network retrieval list, and update the network retrieval list according to a sorting result; and
  store a text content in the network browsing information in a corresponding entry of the network retrieval list.

2. The method according to claim 1, further comprising:
  searching websites matched with the network retrieval list through a search engine, and pushing the searched websites according to the sorting of the network retrieval list.

3. The method according to claim 2, wherein the step of searching the websites matched with the network retrieval list through the search engine comprises:
  searching, according to the text content stored in the entry of the network retrieval list, websites matched with the entry in the network retrieval list through the search engine.

4. The method according to claim 1, wherein the network browsing information comprises: at least one of website address information transmitted by a user to a network server through a client, an accessed text content, a duration of a single access of the user, and a number of user access times of the user to the same website.

5. The method according to claim 1, further comprising: storing the generated or updated network retrieval list in an account in the user data server.

6. The method according to claim 5, when a user needs to acquire a retrieval service, uploading, by the user data server, the network retrieval list stored in the account onto a web server.

7. The method according to claim 1, wherein the step of calculating the score for the extracted evaluation data according to the preset algorithm by the user data server comprises:

setting that there are N records in the network retrieval list, comparing the extracted evaluation data with existing evaluation data of N records in the network retrieval list, respectively; when a similarity is greater than or equal to a first preset threshold, setting a weight value as 1; when a similarity is smaller than or equal to a second preset threshold, setting a weight value as 0; when a similarity is smaller than the first preset threshold and greater than the second preset threshold, setting a weight value as an integral multiple of 1/N; and adding the weight values to acquire M, where N>0, 0<1/N<1, M≤N;

if a user accesses a record for X times, and the durations of the accesses are T1, T2, . . . Tx, respectively, then an average duration of each access T=(T1+T2+ . . . +Tx)/X; and calculating the score Q=(M/N)×T.

8. The method according to claim 1, wherein the step of comparing and sorting the calculated score and the score stored in the network retrieval list, and updating the network retrieval list according to the sorting result by the user data server comprises:

comparing the score Q with scores of N entries in the network retrieval list respectively; if Q is smaller than a score Qi of the $i^{th}$ entry, and greater than a score Qi+1 of the $(i+1)^{th}$ entry, recording a text content accessed currently and the score Q to the network retrieval list, recording a sequence number as i+1, and increasing sequence numbers of entries after the $(i+1)^{th}$ entry by 1;

if the score Q is the same as a score of the $i^{th}$ entry in the network retrieval list, updating the text content accessed currently and the score Q to the $i^{th}$ record of the network retrieval list, and keeping other records of the network retrieval list unchanged; and if the score is smaller than scores of all entries in the network retrieval list, recording the text content accessed currently and the score Q in the network retrieval list, and setting a sequence number as N+1.

9. An information collection device, comprising:
a processor; and
a memory for storing instructions executable by the processor;
wherein the processor is configured to:
acquire network browsing information;
evaluate the network browsing information, sort the network browsing information according to evaluation results, and generate or update a network retrieval list according to a sorting result;
wherein the processor is further configured to:
extract evaluation data for evaluating a score from the acquired network browsing information;
calculate the score for the extracted evaluation data according to a preset algorithm;

determining whether the network retrieval list exists;
when the network retrieval list does not exist, generate a new network retrieval list, add the network browsing information and the calculated score to the network retrieval list, and set the ranking of the network browsing information to the top;
when the network retrieval list exist, compare and sort the calculated score and a score stored in the network retrieval list, and update the network retrieval list according to a sorting result; and
store a text content in the network browsing information in a corresponding entry of the network retrieval list.

10. The device according to claim 9, wherein the processor is configured to:
search websites matched with the network retrieval list through a search engine, and push the searched websites according to the sorting of the network retrieval list.

11. The device according to claim 10, wherein the processor is further configured to:
search, through the search engine according to the text content stored in the entry of the network retrieval list, websites matched with the entry in the network retrieval list.

12. The device according to claim 9, wherein the network browsing information comprises: at least one of website address information transmitted by a user to a network server through a client, an accessed text content, a duration of a single access of the user, and a number of user access times of the user to the same website.

13. The device according to claim 9, wherein the processor is further configured to store the generated or updated network retrieval list in an account in the user data server.

14. The device according to claim 9, wherein the processor is further configured to:
set that there are N records in the network retrieval list, compare the extracted evaluation data with existing evaluation data of N records in the network retrieval list, respectively; when a similarity is greater than or equal to a first preset threshold, set a weight value as 1; when a similarity is smaller than or equal to a second preset threshold, set a weight value as 0; when a similarity is smaller than the first preset threshold and greater than the second preset threshold, set a weight value as an integral multiple of 1/N; and add the weight values to acquire M, where N>0, 0<1/N<1, M≤N;
if a user accesses a record for X times, and the durations of the accesses are T1, T2, . . . Tx, respectively, then an average duration of each access T=(T1+T2+ . . . +Tx)/X; and
calculate the score Q=(M/N)×T;
compare the score Q with scores of N entries in the network retrieval list respectively; if Q is smaller than a score Qi of the $i^{th}$ entry, and greater than a score Qi+1 of the $(i+1)^{th}$ entry, record a text content accessed currently and the score Q to the network retrieval list, record a sequence number as i+1, and increase sequence numbers of entries after the $(i+1)^{th}$ entry by 1;
if the score Q is the same as a score of the $i^{th}$ entry in the network retrieval list, update the text content accessed currently and the score Q to the $i^{th}$ record of the network retrieval list, and keep other records of the network retrieval list unchanged; and
if the score is smaller than scores of all entries in the network retrieval list, record the text content accessed currently and the score Q in the network retrieval list, and set a sequence number as N+1.

* * * * *